Aug. 14, 1951  C. W. GRAHAM  2,564,303
PERSPECTIVE RECTIFICATION ENLARGER
Filed April 21, 1947  3 Sheets-Sheet 1
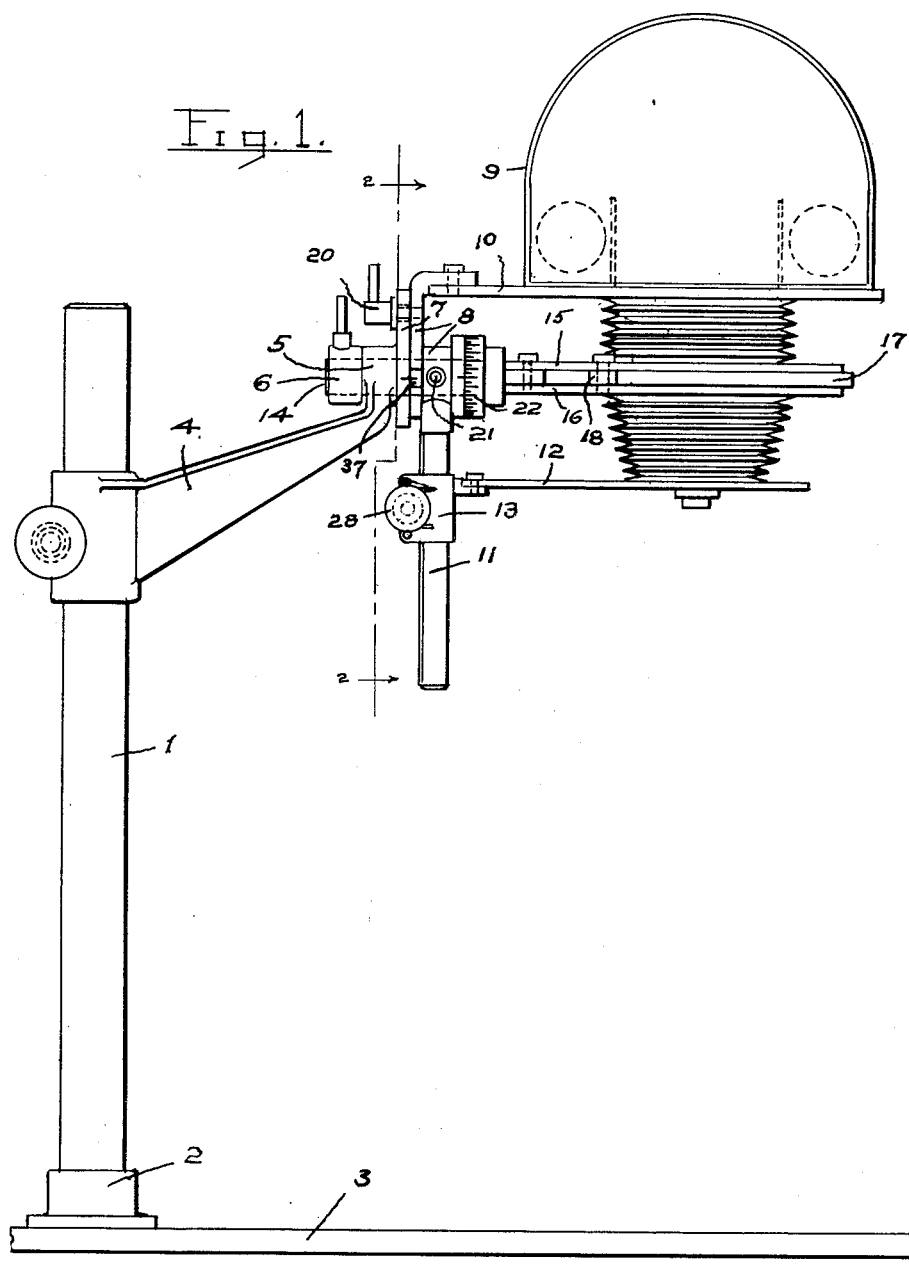
INVENTOR.
Charles W. Graham
BY Aug. 14, 1951 C. W. GRAHAM 2,564,303
PERSPECTIVE RECTIFICATION ENLARGER
Filed April 21, 1947 3 Sheets-Sheet 2
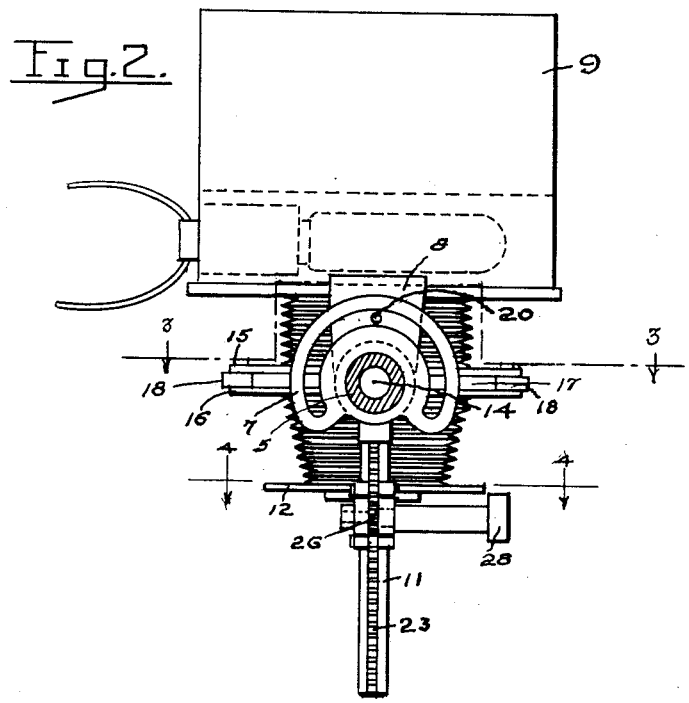
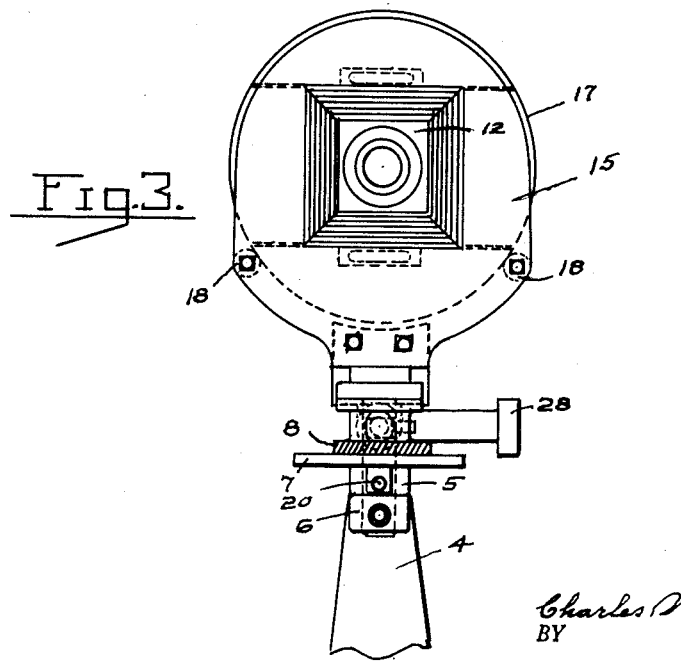
INVENTOR.
Charles W. Graham
BY Aug. 14, 1951 — C. W. GRAHAM — 2,564,303
PERSPECTIVE RECTIFICATION ENLARGER
Filed April 21, 1947 — 3 Sheets-Sheet 3
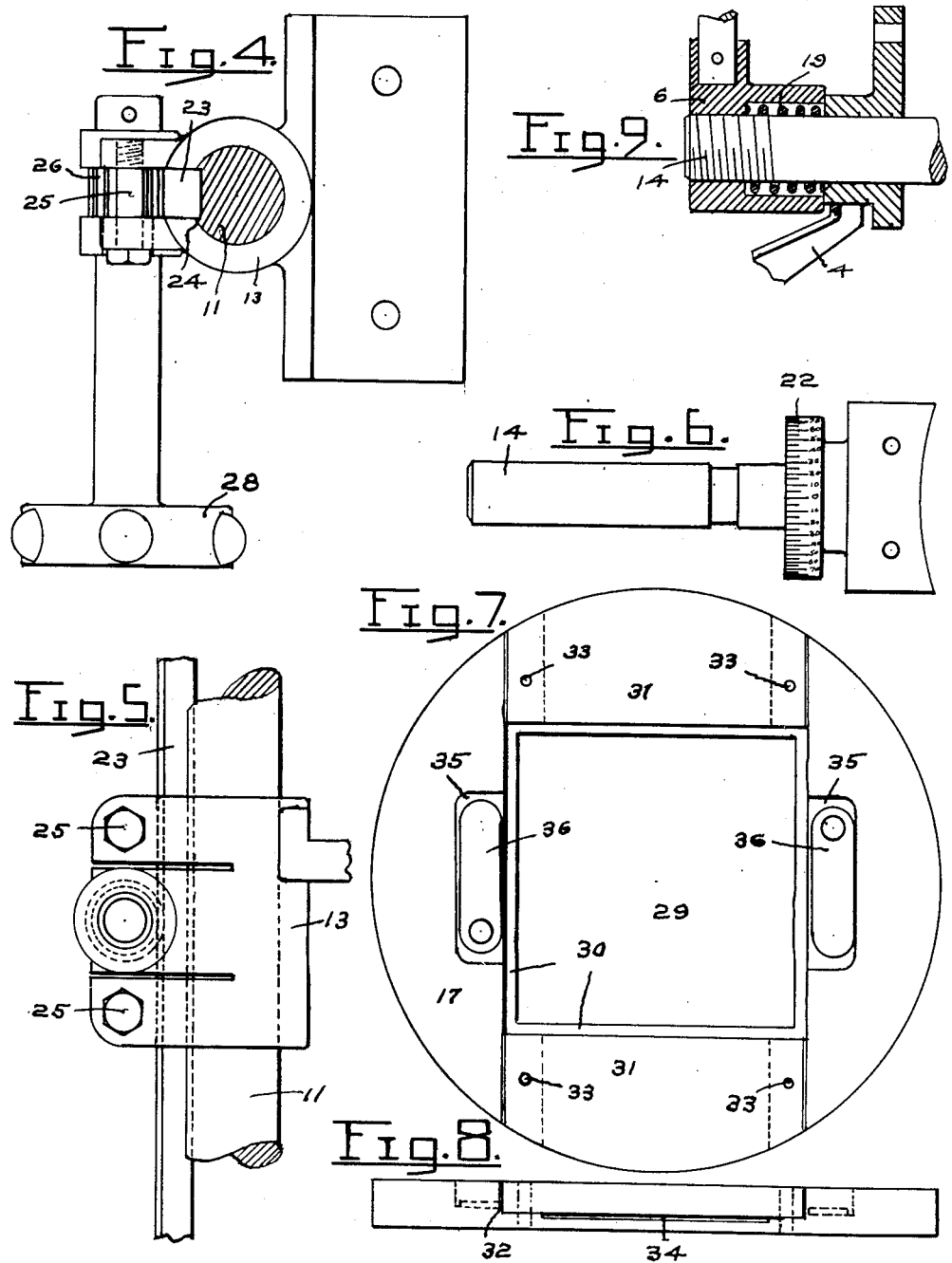
INVENTOR.
Charles W. Graham
BY Patented Aug. 14, 1951

2,564,303

UNITED STATES PATENT OFFICE 2,564,303

PERSPECTIVE RECTIFICATION ENLARGER

Charles W. Graham, Washington, D. C.; George W. Reiber and The Hamilton National Bank of Washington, executors of said Charles W. Graham, deceased Application April 21, 1947, Serial No. 742,840

5 Claims. (Cl. 88—24)

This invention relates to an enlarging apparatus for making enlarged prints of negatives by means of projection, also for making large negatives from small negatives, also to function as a copying camera with auxiliary lighting apparatus.

A principal object of the invention resides in a combination of and arrangement of elements whereby a rotary element carrying a negative element, a lamp housing and a lens carrying element are so combined as to permit tilting of the negative carrying element relative to the lamp house and the lens carrying element while in their normal operative positions, to thereby change or correct straight lines in the projected image on the print paper or larger negative positioned on the enlarging board.

Another object of the invention resides in the means provided to lock all of the elements together as a single unit permitting the entire assembly to be tilted to a horizontal or other position to increase the magnification of the projected image.

A further object is to produce an apparatus that is easy to manufacture of simple and easily machined parts to thereby reduce the initial cost so as to produce a product capable of performing the necessary function of such an apparatus by those only slightly skilled in the art.

Further objects and advantages will become apparent as the description progresses, reference now being had to the drawings accompanying this specification.

Figure 1 is a side elevation of an apparatus embodying the features mentioned. In the view the apparatus is set up as for ordinary enlarging practice.

Figure 2 is a horizontal section taken on substantially the line 2—2 of Figure 1.

Figure 3 is a horizontal section taken on substantially the line 3—3 of Figure 2, leaving off the lens carrying element that would normally show underneath.

Figure 4 is an enlarged detail taken on substantially the line 4—4 of Figure 2 leaving off the lens carrying element, except the bracket to which the lens carrying element is secured in normal assembly. This view is to clearly show the manner of mounting and maintaining the lens carrying element in normal adjusted position.

Figure 5 is a side view of Figure 4 with a part of the lens carrying bracket broken away but showing clearly the manner of mounting the lens carrying bracket and the manner of giving it a close running fit on the support rod.

Figure 6 is an enlarged view to clearly show the construction of the rotary element that normally carries the negative carrying element, the lamp housing and the lens carrying element when the assembly is locked into a single unit for swinging the entire apparatus into a horizontal position.

Figure 7 is a plan view of the removable negative carrying element showing how the negative to be enlarged is mounted and oriented to any desired position in a horizontal plane.

Figure 8 is a side elevation of Figure 7.

Figure 9 is a sectional detail of the end clamping member of the rotary element with a compression spring incorporated to take up any slack or lost motion that may occur when the clamp nut is released to permit the rotary element to rotate.

Referring to Figure 1 a good understanding of the general arrangement of the apparatus will be had. The enlarger element is mounted for vertical adjustment on an ordinary standard of the well known variety as at 1, this standard in turn is mounted in a floor plate 2 which is in turn mounted on a table board 3 on which the print paper is positioned to receive the projected image. Mounted for vertical adjustment on the standard 1 is a bracket 4, shown here as simply sliding along the vertical standard for any desired height adjustment.

This bracket 4 would in manufacture be counterbalanced and probably have a rack and pinion to elevate it easily along the standard, but since these features are well known and used devices they have not been shown here.

The hub 5 of the supporting bracket 4 carries an arcuate flange 7 to which is secured for rotary movement the hub and bracket 8, which hub 8 carries the lamp house 9 supported on the plate member 10 in turn secured to the bracket 8. The hub 8 also carries the lens carrying element rod 11, which in turn carries the lens plate 12 secured to the vertically adjusted bracket 13 as shown in enlarged detail in Figs. 4 and 5.

The rotary element 14 of Figures 1 and 6 mounted for rotation in the hub 5 of the supporting bracket 4 carries on its inner end two separated plate members 15 and 16 which in turn support the rotary negative carrier member 17 of Figs. 1, 3 and 7. By reference to Fig. 3 it will be seen that two rollers or studs 18 separate the plates 15 and 16 which form stop members for the negative carrier 17 when it is inserted into the space between the plates 15 and 16. These stops 18 center the rotary plate 17 with the optical center of the apparatus and by rotating the negative carrier 17 any desired angular position within its capacity may be had, and being free for some lateral adjustment away from the optical center any desired part of a negative can be placed in the optical center for projection.

In photography it is sometimes desirable to tilt the taking camera in order to get the desired parts of the object or scene onto the negative. In the case of photographing objects having vertical lines like the sides or corners of buildings, this tilting of the camera causes diverging lines on the negative which are referred to as distortions and it is desirable when making enlargements of these negatives to correct, at least in part, these distortions by means of tilting the negative relative to the lamp house and the lens projecting the image whereby some or all of the distortion may be removed from the projected image so that the finished print will appear more like the natural scene. Sometimes it is desirable and necessary to also tilt the print paper on the enlarging board to further correct the distortion, but since very much of such distortion can be corrected sufficiently by simply tilting the negative it was thought not desirable to include a paper tilting assembly, since at this date it is now not generally patentable since it is an old and well known practice and can be applied here if desired.

The tilting of the negative for correcting distortion is ordinarily accomplished by loosening the clamp nut 6 slightly and tilting the negative carrier as a unit to either side as may be necessary and then adjust the position of the print paper support to suit conditions. When the negative has been tilted the desired amount the clamp nut may again be tightened or left loose if the structure as disclosed in Figure 9 is employed. Here the stiff compression spring 19 is provided to normally hold the tilted negative carrier quite firmly against the hub 5 without clamping the nut 6.

During any tilting movement of the negative carrier the bracket 8 is held from movement along with the rotary element 14 by means of the arcuate flange 7 of the supporting hub 5 which is an integral part of the hub. The bracket 8 is securely clamped to this arcuate flange by means of the hand nut 20 which is screwed into the bracket 8 carrying the lamp house, thus when the clamp nut 6 is loosened to tilt the negative carrier the lamp house and the lens carrying element will remain in normal positions since both of these are carried by the bracket and flange 8 secured to the arcuate flange 7 thus making them a single unit.

When it is desired to tilt the entire assembly to a horizontal position to increase the size of the enlargement by thus being able to project the image a greater distance than is possible when projected onto the regular enlarging board, the hollow set screw 21 is tightened onto the rotary element 14 and both of the hand clamps 6 and 20 are loosened when the entire assembly may be tilted to any desired position to horizontal or beyond. By tightening the hollow set screw 21 the lamp house, negative carrier and the lens carrier become a single unit and may be rotated to any position when the clamp nuts 6 and 20 may be tightened thus locking the assembly to the supporting hub 5.

In order to determine accurately any desired position of tilt of the entire assembly graduations may be provided on the top edge of the arcuate flange and an index mark placed on the face of the flange 8 adjacent thereto, which will enable the user to accurately and quickly adjust the apparatus as may be desired, or if graduations on the top edge of the arcuate flange are too high up for easy visual inspection an index finger may be projected from the side of the flange 8 to align with a mark as at 37, Figure 1.

The lens carrier plate 12 is secured to the bracket 13 and the bracket 13 has vertical adjustment along the supporting rod 11. In structures of this kind it is desirable that no lateral movement is permitted in the lens bracket which would tend to throw the lens out of the optical axis. In the structure detailed in Figs. 4 and 5 lateral movement of the lens mount is completely absorbed. The supporting rod 11 has a rack bar 23 mounted in a slot 24 and securely screwed to the bar 11.

The hub 13 is slotted as at 24a to have sliding fit along the rack bar 23 and the rod 11 and by means of the clamp bolts 25 the fit of the hub 13 along the rack bar 23 and the rod 11 can be made as fine as desired.

A pinion 26 is provided that meshes with the rack bar 23 and is secured to the spindle of the hand wheel 28 which provides means for adjusting the lens element relative to the negative while the hub 13 has a fairly tight sliding fit along the supporting bar 11 and rack bar 23. This arrangement will prevent any lateral movement to the lens carrier element and will absorb any natural wear.

The rotary negative carrier is shown in detail in Figs. 7 and 8 and since it carries some desirable features it may now be discussed. Figure 7 is a plan view of the negative holder 17 and shows an opening 29 with ledges 30 around the inside to support glass plates or other means for supporting negatives. This negative carrier is adapted to handle strips of roll film as well as cut film or film pack film. Removable sections 31 rest in recesses 32 extending across the plate and are held from lateral movement by the side walls of the recesses 32 and pins 33. A shallow recess 34 Figure 8 is provided for the reception of a strip of roll film negative material. The sections 31 are lifted from the recesses 32, the film placed in the space 34 when the sections 31 are replaced with the ends of the strip of film projecting from the sides of the carrier 17.

The depressions 34 may be just sufficient to let the strip film rest freely and move freely from end to end for placing another negative in the projection axis without taking the carrier 17 from the machine.

When using roll film there will not be much space for rotary movement of the negative carrier 17 but the print paper holder can be moved and rotated to any desired position on the enlarging board.

In the recesses 35 are placed clamp springs 36 adapted to swing outward and press on the glass plates to hold them and the negative therebetween in proper position during the projection period.

The fit of the circular negative carrier should have a snug sliding and rotating fit in the negative carrier plates 15 and 16 to remain in any adjusted position and to be held in place when the entire assembly is tilted to a horizontal position.

The lamp house shown is of the indirect light type but it is understood that any type of lamp house may be provided including either a condenser type or a fluorescent type or any other type.

I claim:

1. An enlarging apparatus comprising a supporting element, a rotary element carried by said supporting element, and a negative carrier forming a part of said rotary element and tiltable therewith as said rotary element is rotated, a bracket mounted on said rotary element and carrying an illuminating element on one side of said negative carrier, with means for securing said bracket to said supporting element and another means for securing said bracket to said rotary element, said two securing means being operable independently to permit said rotary means to rotate independently of said bracket or to rotate with said bracket when one or the other is secured against independent movement, the entire assembly carried by said supporting means.

2. An enlarging apparatus comprising a supporting element, a rotary element carried by said supporting element, and a negative carrier forming a part of said rotary element and tiltable therewith as said rotary element is rotated, a bracket mounted on said rotary element and carrying an illuminating element on one side of said negative carrier and a lens carrying element on the other side of said negative carrier, with means for securing said bracket to said supporting element and another means for securing said bracket to said rotary means, said two securing means acting independently to permit said bracket to remain stationary while said rotary means is rotated or to lock the said bracket and said rotary means together to permit them to rotate as a unit.

3. An enlarging apparatus comprising a supporting element, a rotary element carried by said supporting element, and a negative carrier forming a part of said rotary element and tiltable therewith as said rotary element is rotated, a bracket mounted on said rotary element and carrying an illuminating element on one side of said negative carrier and a lens carrying element on the other side of said negative carrier, said lens carrying element and said illuminator carrying element being connected with said negative carrying element by means of flexible light tight means to permit relative movement between said elements, means for securing said bracket to said supporting element and other means for securing said bracket to said rotary element.

4. An enlarging apparatus comprising a supporting member, a rotary element carried by said supporting member, said rotary element carrying a negative supporting element, a bracket mounted on said rotary element and bearing against said supporting member, said bracket carrying a lamp housing and a lens element, means securing said bracket to said supporting member, a shoulder on said rotary member bearing against said bracket, a clamping member on the end of said rotary member to clamp said bracket against said supporting member, a compression spring in the hub of said clamping member to frictionally hold said rotary member against movement when said clamping member is released from clamping position.

5. An enlarging apparatus comprising a supporting member, a rotary element carried by said supporting member and having a shoulder, a bracket mounted on said rotary member and held in contact with said supporting member and said shoulder by a clamping member on said rotary member, an arcuate flange on said supporting member and means for clamping said bracket to said arcuate flange to hold said bracket from movement when said rotary member is rotated, other clamping means for securing said bracket to said rotary member to rotate therewith when the clamping means securing said arcuate flange to said bracket is released, said bracket carrying a lamp house and a lens element and said rotary member carrying a negative supporting member.

CHARLES W. GRAHAM.

REFERENCES CITED

The following references are of record in the file of this patent:

UNITED STATES PATENTS

| Number | Name | Date |
|---|---|---|
| 2,262,972 | Simmon | Nov. 18, 1941 |
| 2,266,908 | Rogers | Dec. 23, 1941 |
| 2,303,920 | Drucker | Dec. 1, 1942 |
| 2,344,558 | Moore | Mar. 21, 1944 |
| 2,353,241 | Hughey | July 11, 1944 |
| 2,369,897 | Hjort | Feb. 20, 1945 |